(12) United States Patent
Regupathy et al.

(10) Patent No.: US 12,339,799 B2
(45) Date of Patent: Jun. 24, 2025

(54) DYNAMIC FUNCTIONAL INPUT/OUTPUT (IO) DEVICE INTERFACE SELECTION THROUGH POWER STATE TRANSITIONS

(71) Applicant: Intel Corporation, Santa Clara, CA (US)

(72) Inventors: Rajaram Regupathy, Bangalore (IN); Rolf H. Kuehnis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 748 days.

(21) Appl. No.: 17/483,146

(22) Filed: Sep. 23, 2021

(65) Prior Publication Data

US 2022/0012202 A1 Jan. 13, 2022

(51) Int. Cl.
*G06F 13/38* (2006.01)
*G06F 13/40* (2006.01)

(52) U.S. Cl.
CPC .......... *G06F 13/385* (2013.01); *G06F 13/387* (2013.01); *G06F 13/4059* (2013.01); *G06F 13/4063* (2013.01); *G06F 2213/0042* (2013.01)

(58) Field of Classification Search
CPC .. G06F 13/385; G06F 13/387; G06F 13/4059; G06F 13/4063; G06F 2213/0042
See application file for complete search history.

(56) References Cited

U.S. PATENT DOCUMENTS

| | | | | |
|---|---|---|---|---|
| 7,024,501 B1* | 4/2006 | Wright | .................. | A63F 13/843 710/36 |
| 7,565,457 B2* | 7/2009 | Ooi | ..................... | G06F 13/4081 710/72 |
| 8,788,852 B2* | 7/2014 | Chun | ...................... | G06F 1/266 713/340 |
| 2005/0198428 A1* | 9/2005 | Ikeda | ...................... | G06F 13/28 710/313 |
| 2010/0262848 A1* | 10/2010 | Bobrek | ................... | H04L 47/30 713/320 |
| 2016/0085280 A1* | 3/2016 | Harel | ..................... | G06F 1/3287 710/14 |
| 2019/0079887 A1* | 3/2019 | Itkin | ....................... | H04L 41/04 |

* cited by examiner

*Primary Examiner* — Henry Tsai
*Assistant Examiner* — John R Roche
(74) *Attorney, Agent, or Firm* — Alliance IP, LLC

(57) ABSTRACT

In one embodiment, an apparatus includes interconnect circuitry to implement one or more layers of a Universal Serial Bus (USB)-based protocol. The interconnect circuitry can implement a first USB-based interface and a second USB-based interface. The apparatus further includes telemetry circuitry to generate telemetry data, cause the telemetry data to be transmitted via the first USB-based interface, detect a power state transition in the apparatus, cause the telemetry data to be buffered based on detecting the power state transition, and cause the buffered telemetry data to be transmitted via the second USB-interface based on a set interface request indicating the second USB-interface.

23 Claims, 12 Drawing Sheets

DYNAMIC FUNCTIONAL INPUT/OUTPUT (IO) DEVICE INTERFACE SELECTION THROUGH POWER STATE TRANSITIONS

TECHNICAL FIELD

This disclosure relates in general to the field of computer systems and, more particularly, to dynamic functional input/output (IO) device interface selection.

BACKGROUND

High-bandwidth transport typically need a phase-locked loop (PLL) and a high-power consuming physical interface (PHY). In some situations, however, it may be desired to conserve energy or batter life of a computing system, so the platform may switch to a lower power PHY interface to allow for energy conservation. Current measures to provide such conservation can lead to one or more issues for IO devices. For example, during power transitions, a user experience with respect to the IO device can be impacted and such transitions can cause issues with debugging.

BRIEF DESCRIPTION OF THE DRAWINGS

Like reference numbers and designations in the various drawings indicate like elements.

DETAILED DESCRIPTION OF EXAMPLE EMBODIMENTS

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A or B" means (A), (B), or (A and B). For the purposes of present disclosure, the phrase "A, B, or C" means (A), (B), (C), (A and B), (A and C), (B and C), or (A, B, and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

Figure 1:
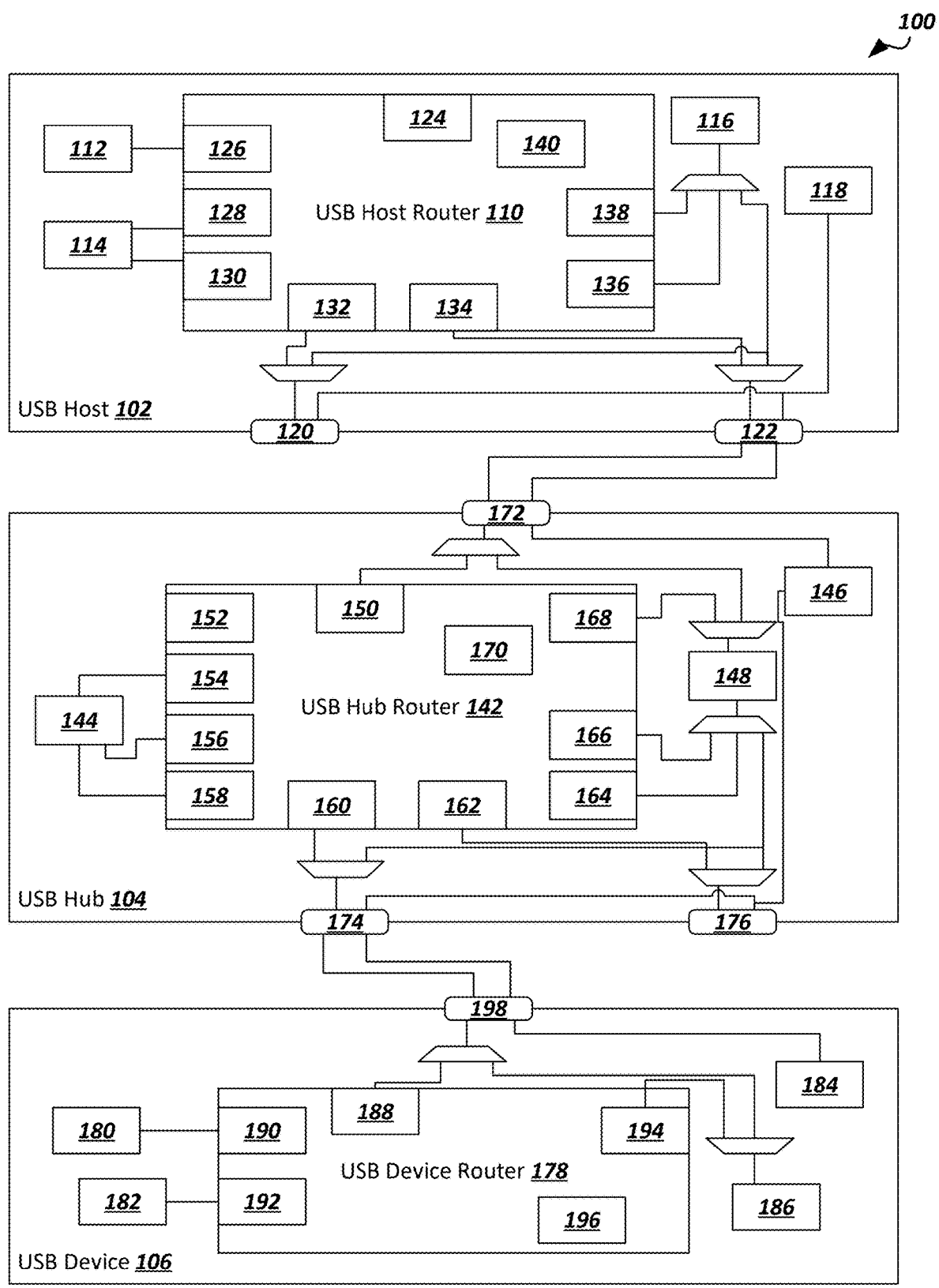
FIG. 1 is a schematic diagram of an example universal serial bus (USB) system in accordance with embodiments of the present disclosure.

FIG. 1 is a schematic diagram of an example universal serial bus (USB) system 100 in accordance with embodiments of the present disclosure. FIG. 1 illustrates the dual bus architecture of an example USB system 100, such as those implemented by USB v4 (also referred to herein as "USB4") or higher protocols. As architected, backward compatibility is supported with minimum interoperability starting at USB v2.0, working up through USB v3.2, and finally up to USB4 based on the highest common bus level supported across the interconnected components.

The USB system 100 can include a USB4 host 102 connected to a USB4 hub 104 by a USB link. The USB4 hub 104 can be connected to a USB4 device 106 by a USB link. The USB4 hub 104 can also be connected to other types of devices, such as displays or peripherals or other devices. The USB4 host 102 can be (or can be coupled to) a host device, such as a host device, computer, server, motherboard, processor or processor bank, or other type of host device. The USB4 hub 104 can be (or can include) a dongle, docking station, or other intermediate device. The USB4 device 106 can be an endpoint device, peripheral device, memory, or other type of device that connects to the USB4 host 102 and/or USB4 hub 104.

The system 100 can include a USB4 host 102. The USB4 host can include a host router 110, an internal host controller, and DisplayPort source 112, such as a DisplayPort2.0 source. The DisplayPort2.0 (or DP2.0) source can be a graphics processor and can include a DisplayPort transmitter (DPTX) that supports DP2.0 and higher. The DPTX can be compliant with a Video Electronics Standards Association (VESA) DisplayPort 2.0 protocol standard or future DisplayPort protocol standards versions.

A USB4 host supports 20G USB4 operation (Gen2×2) and optionally 40G USB4 operation (Gen3×2). A USB4 host can also support DisplayPort Alt Mode on all of its downstream facing ports (DFP). See the USB Type-C Specification for a full definition of the requirements and details regarding DisplayPort Alt Mode support on a DFP.

A USB4 host can also optionally contain a PCIe controller 114. PCIe controller 114 can include (or be connected to) a PCIe root complex or PCIe switch complex for controlling PCIe-based routing to one or more peripheral devices. The PCIe controller 114 can be connected to the USB4 host router 110 through one or more PCIe adapters (e.g., PCIe downstream facing adapters 128, 130). The USB4 hub 104 can include (or be connected to) a PCIe switch 144 via PCIe upstream facing adapter 154 and PCIe downstream facing adapters 156 and 158. The USB4 device 106 can include a PCIe function 180 that is the PCIe downstream connected component or endpoint device that communicates with the PCIe controller 114 across the USB4 fabric 100. The USB4 device router 178 can include a PCIe upstream facing adapter 190 to couple the PCIe function 180 with upstream connected components, such as the USB4 hub 104, PCIe switch 144, and PCIe controller 114.

The USB4 host 102 can include a USB host router 110. The USB4 hub 104 can include a USB hub router 142. The USB4 device 106 can include a USB device router 178. A router is a fundamental building block of the USB4 architecture. A router maps Tunneled Protocol traffic to USB4 packets and routes packets through the USB4 fabric 100. A router also distributes and synchronizes time throughout the USB4 Fabric via its Time Management Unit (TMU), such as TMU 140, 170, and 196. A router is discovered and configured by a connection manager (e.g., a host interface adapter) 124 located within the USB4 host. The router includes a flat point-to-point, configurable switch necessary to create the internal paths between adapters. One router typically exists within each instance of a USB4 host 102, USB4 hub 104, or USB4 device 106. There are two types of Routers: Host Routers and Device Routers.

USB4 host or USB4 peripheral device can optionally support interoperability with Thunderbolt 3 (TBT3) products. A USB4 hub is required to support interoperability with Thunderbolt 3 products on all of its DFP. A USB4-Based Dock is required to support interoperability with Thunderbolt 3 products on its upstream facing ports (UFP) in addition to all of its DFP.

When interoperating with a TBT3 product, Thunderbolt Alt Mode is established on the link between products. The USB Type-C Specification describes how a USB4 product negotiates and enters Thunderbolt Alt Mode.

The USB4 host 102 can include (or can be connected to) a display port (DP) source 112, such as a graphics processing unit (GPU) or other source of graphics, video, images, etc. The USB4 host router 110 can include a DP_IN adapter 126 that can facilitate an interface to the DP source 112. In embodiments, the DP source can be a USB4 peripheral device or can be connected to the USB4 host router 110 via a DisplayPort-based interconnect (e.g., via a DisplayPort 2.0 protocol interconnect).

The USB4 hub 104 can include a DP_OUT adapter 152 for outputting DP signaling to a DP sink, such as a display or monitor. The USB4 hub 104 can also transmit DP signaling via a USB4 tunnel to the USB4 device 106. The USB4 device 106 can include a DP_OUT adapter 192 for outputting DP signals to a DP sink 182, which can be a display or monitor.

The internal Enhanced SuperSpeed host 116 exposes one or more Downstream USB3 ports, which can be connected to a USB Endpoint or Downstream USB3 Protocol Adapter. The upstream port of the internal Enhanced SuperSpeed Hub interfaces with an Upstream USB3 Protocol Adapter that forwards packets to the Upstream Facing Port of the USB4 hub.

Each router contains up to 64 adapters. Adapters provide an interface between a router and an external entity. There are three types of Adapters: Protocol Adapters, Lane Adapters, and Control Adapters. A Protocol Adapter is used to translate between a supported native protocol and a USB4 tunnel. There are four types of Protocol Adapters: USB3 Adapters 136, 138, 164, 166, 168, and 194, DisplayPort (DP) Adapters 126, 152, and 182, PCIe Adapters 128, 130, 154, 156, 158, and 190, and Host Interface Adapters 124.

A router can support an internal Control Adapter that is used solely for transmitting and receiving Control packets to and from the Transport Layer. Unlike the non-Control Adapters, the Control Adapter does not connect directly to a Link and thus does not have a Physical Layer associated with it.

A USB4 Port is the entity that provides the USB4 functional interface that resides on each end of a USB4 Link. It consists of the transmit and receive Lanes of the USB4 data bus along with a two-wire Sideband (SB) Channel (SBTX/SBRX). USB4 Ports operate as either a Single-Lane Link or Dual-Lane Link. When operating as a Single-Lane Link, Lane 1 of the USB4 Port is disabled. When operating as a Dual-Lane Link, Lanes 0 and 1 are logically bonded together to provide a single data channel. Example USB4 ports are shown as elements 132, 134, 150, 160, 162, and 188. The USB4 ports can accommodate a USB Type-C connector or Thunderbolt (e.g., TBT3) type connector, etc.

The primary communication channel of the USB4 Fabric is over the USB4 Link that interconnects two USB4 Ports. The USB4 Link transports packets for both Tunneled Protocol traffic and bus management traffic between Routers. The Sideband Channel of a USB4 Port is used to initialize and manage the USB4 Link between the USB4 Ports. For a USB4-enabled USB Type-C port, the complete interface includes a USB4 Port, a USB 2.0 data bus, and the USB Type-C Configuration Channel (CC) along with power/ground (VBUS, VCONN and GND).

At a high level, a USB4 hub 104 is functionally similar to a USB 3.2 hub—it consists of one Upstream Facing Port and one or more Downstream Facing Ports. USB4 hub 104 functionally operates as a tree-like structure for enabling one or more Downstream Facing Ports to be served by one Upstream Facing Port, typically for the purpose of port expansion.

In addition to the USB4-specific hub functionality, USB 3.2 and USB 2.0 hub functionality is supported such that Downstream Facing Ports of a USB4 hub can support backward-compatibility with USB 3.2 and USB 2.0 devices. USB 2.0 functionality can be provided via USB 2.0 host 118 connected to a USB 2.0 hub 146 and USB 2.0 function 184.

A USB4 hub 104 contains a Device Router 142, an Enhanced SuperSpeed USB hub 148 (which can connect the Enhanced SuperSpeed host 116 to Enhanced SuperSpeed function 186), a PCIe switch 144, and a USB 2.0 hub 146. A USB4 hub supports 20G USB4 operation (Gen2x2) and 40G USB4 operation (Gen3x2). A USB4 hub is required to support DisplayPort Alt Mode on all of its DFP. See the USB Type-C Specification for a full definition of the requirements and details regarding DisplayPort Alt Mode support on a DFP.

The USB4 host 102, hub 104, and device 106 can include one or more USB Type-C connector ports 120, 122, 172, 174, 176, and 198. The USB Type-C connector ports can receive USB Type-C connectors for connected USB compliant components and for transferring information and power between components.

Figure 2A:
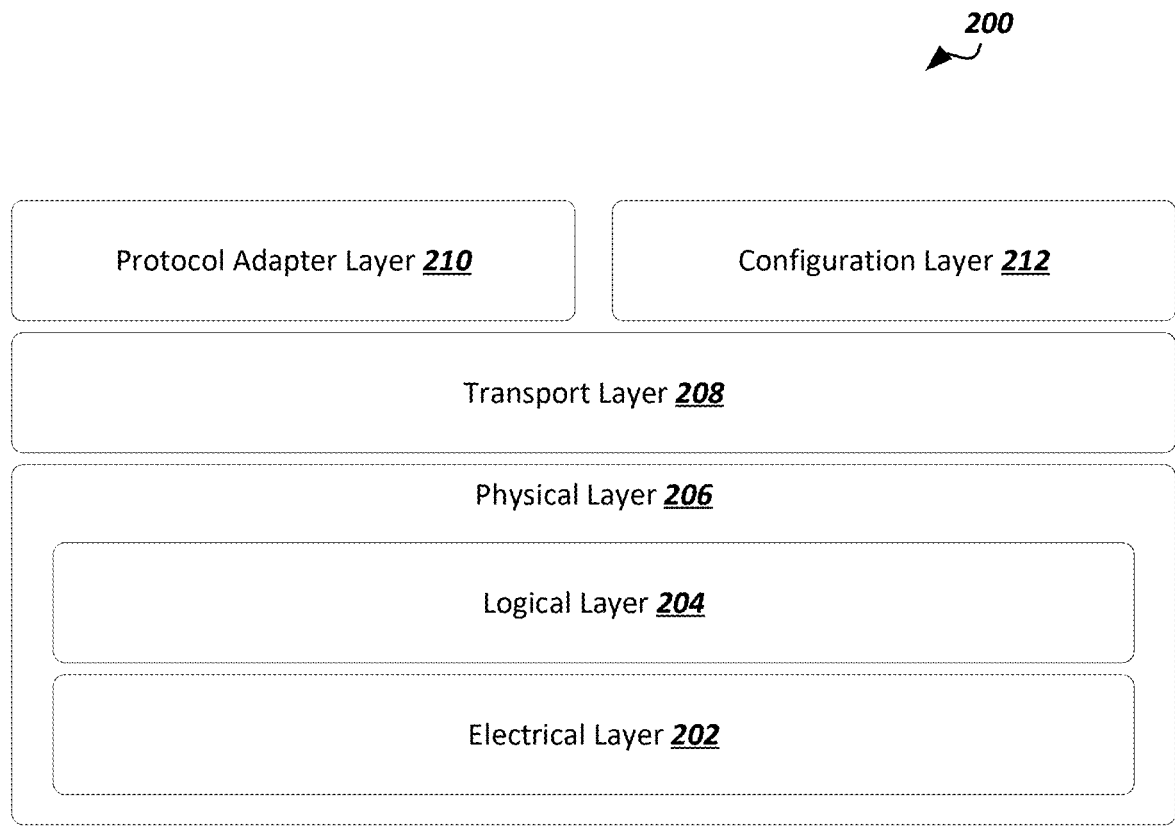
FIG. 2A is a schematic diagram of an example USB protocol stack in accordance with embodiments of the present disclosure.

FIG. 2A is a schematic diagram of an example USB protocol stack 200 in accordance with embodiments of the present disclosure. The USB4 protocol stack 200 can include an electrical layer 202 and a logical layer 204. The electrical layer 202 and logical layer 204 can be considered sub-blocks of the physical layer 206. The electrical layer 202 defines electrical signaling characteristics of a USB4 Link including scrambling, encoding, jitter, and voltage. The logical layer 206 establishes a USB4 link between two routers and provides services to transmit and receive streams of bytes between them. The logical layer 204 resides on top of the electrical layer 202 and below the transport layer 208. The logical layer 204 treats the traffic to and from the transport layer 208 as a byte stream.

The services provided by the logical layer 204 are establishment and maintenance of a USB4 Link with a Link Partner, performance scalability via different speeds and widths, error detection and recovery mechanisms, operation with different media such as passive cable, active cable, and re-timers, support for mechanisms such as clocking compensation, data scrambling, and Forward-error-correcting codes, and power management.

A USB4 link is assisted and managed by a companion Sideband Channel that configures parameters of the USB4 link, interacts with re-timers (if present) and performs USB4 link TxFFE handshake, ensures a correct power down/wake up sequence of the USB4 Link transceivers and Retimers.

The transport layer 208 forwards tunneled packets and control packets through the bus. The transport layer 208 defines packet format, routing, Quality-of-Service (QoS) support, flow control, and time synchronization. The transport layer 208 is where protocol MUXing is performed.

The configuration layer 212 performs router configuration tasks and handles incoming control packets. The configuration layer 212 provides an addressing scheme for control packets within the domain, processes control packets, and delivers a reliable transport mechanism for control packets. Control packets provide the connection manager with access to the configuration spaces of a router.

The protocol adapter layer 210 performs mapping between Tunneled Protocol traffic and USB4 Transport layer packets. A protocol adapter layer 210 is defined by the type of tunneled protocol traffic it sends and receives.

A USB4 host supports USB3 Tunneling, DisplayPort Tunneling, and Host-to-Host Tunneling. A USB4 host can also optionally support PCIe Tunneling. A USB4 hub supports USB3 Tunneling, DisplayPort Tunneling, PCIe Tunneling, and Host-to-Host Tunneling. There are multiple ways that a USB4 hub supports DisplayPort Tunneling. For example, the USB4 hub acts as a "pass through" for DisplayPort Tunneling (i.e. the USB4 hub routes tunneled traffic directly between two of its USB4 Ports). The USB4 hub contains a DP OUT Adapter that receives Tunneled DisplayPort traffic from a USB4 Port and sends it to a DisplayPort Sink.

Figure 2B:
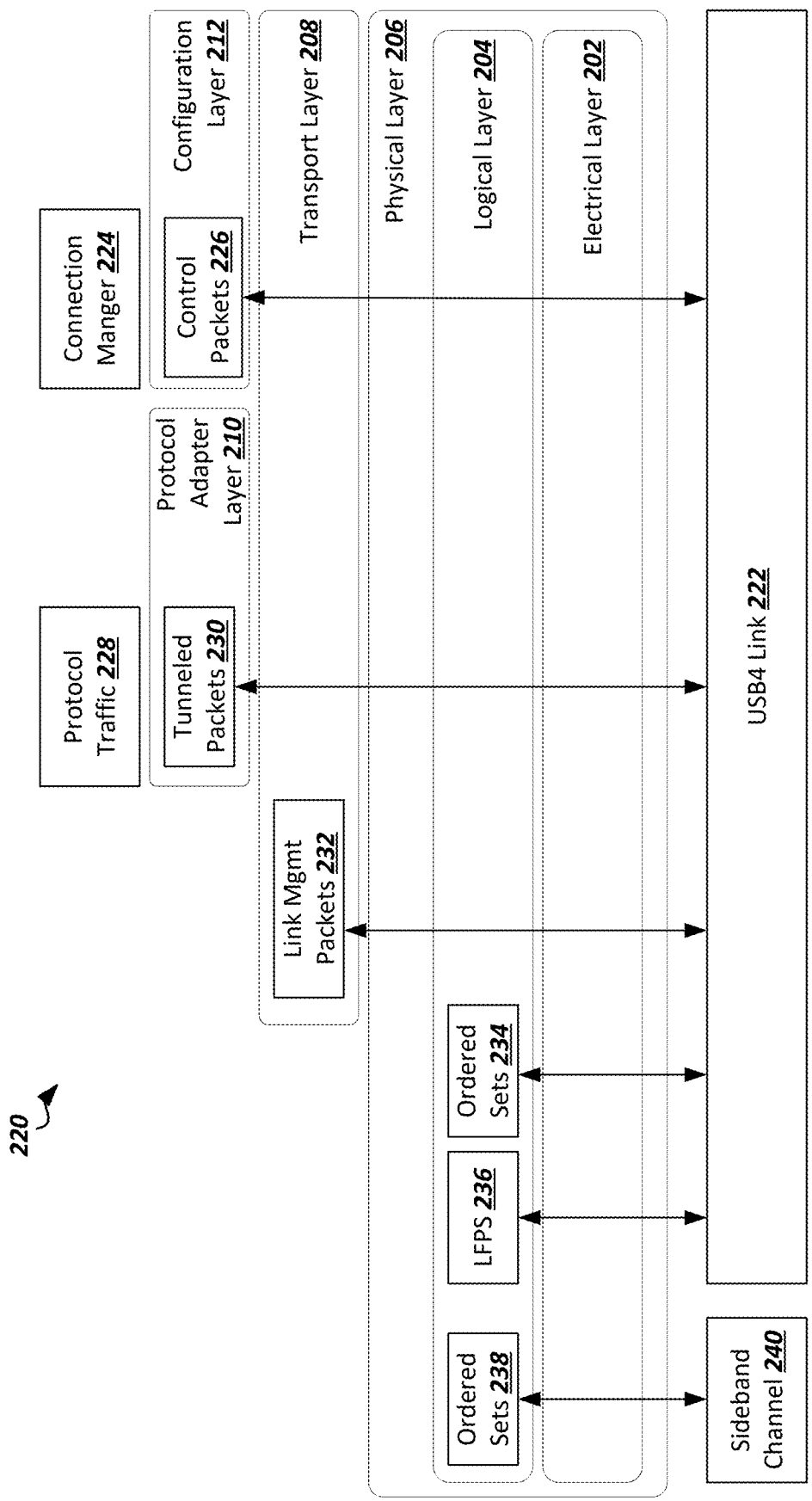
FIG. 2B is a schematic diagram illustrating example universal serial bus functional layer communication pathways in accordance with embodiments of the present disclosure.

FIG. 2B is a schematic diagram 220 illustrating example universal serial bus functional layer communication pathways in accordance with embodiments of the present disclosure. The communication construct can include a USB4 link 222 that communicates packets and ordered sets.

Control packets 226 are used by a connection manager 224 to configure and manage the routers across the bus. Control packets 226 are also used by a router to communicate with the connection manager 224. Control packets 226 are routed over the bus based on a route string that identifies a router's position in a spanning tree. When a control packet 226 originates from the connection manager 224, the route string identifies the router that the packet is targeted to. When a control racket 226 originates from a router, the router string identifies the router that sent the packet. A control adapter in a non-target Router forwards the packet to a USB4 Port. The control adapter of the target router consumes the control packet 226.

Protocol traffic 228 is encapsulated and tunneled over the USB4 fabric in tunneled packets 230. Tunneled packets 230 traverse the USB4 fabric along one or more paths.

Link management packets 232 are confined to a single USB4 Link 222. Link management packets 232 originate in the transport layer 208 of a router at one end of the link and terminate in the transport layer of the router at the other end of the link. The following link management packets are defined: Time Sync packets—Used to synchronize the clocks of the Routers on the bus; Flow Control packets—Used to prevent buffer overflow; Idle packets—Ensure a steady byte stream is fed to the Logical Layer when no other Transport Layer packets are being transmitted.

The logical layer 204 uses ordered sets 234 for tasks such as symbol synchronization, link training, and de-skew between lanes. Ordered sets 238 are 66-bit symbols (at Gen 2 speed) or 132-bit symbols (at Gen 3 speed).

The sideband channel 240 handles the following events: Lane Initialization; Connection or disconnect on a USB4 port; Lane disable or enable; and Entry or exit from Sleep state.

Low frequency periodic signaling (LFPS) 236 is used for in-band communication between two Link Partners when exiting power management link states.

Transport layer packets are either tunneled packets from protocol adapter layers, control packets from the configuration layer, or generated within transport layer (namely, link management packets generated within the transport layer).

Tunneled packets are generated by the protocol adapter layer of a source adapter and handed off to the transport layer. A tunneled packet shall have the header defined for transport layer packets. The protocol adapter layer of a source adapter shall fragment protocol traffic larger than 256 bytes into multiple tunneled packets. Reassembly of protocol traffic from tunneled packets shall be performed by the protocol adapter layer of the destination adapter.

The size of a transport layer packet is always a multiple of 4 bytes. The protocol adapter layer of a source adapter shall add between 0 and 3 bytes of padding to the payload of a tunneled packet to ensure that the tunneled packet is of a size that is a multiple of 4 bytes. The protocol adapter layer of the destination adapter shall remove any bytes of padding.

The content of the padding bytes is implementation-specific and cannot be assumed to have any specific values. However, it is recommended that zero-byte padding be used.

USB devices within a single physical package (i.e., a single peripheral device) can consist of a number of functional topologies including single function, multiple functions on a single peripheral device (composite device), and permanently attached peripheral devices behind an integrated hub (compound device). These flexible modes allow a single peripheral device to share any new function, without hindering normal operation of the port that allows for USB-based debug, as USB may be a critical debug interface. For instance, Enhanced SuperSpeed from USB allows application developers with trace bandwidth of up to 10 Gbps, and USB Type-C ports could double this speed with Super Speed Plus ports.

Figure 3B:
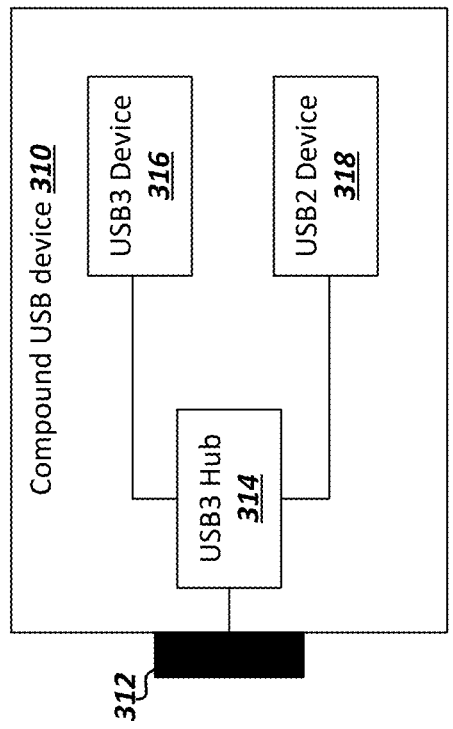
FIGS. 3A, 3B illustrate example topologies for a composite USB device and a compound USB device, respectively.
Figure 3A:
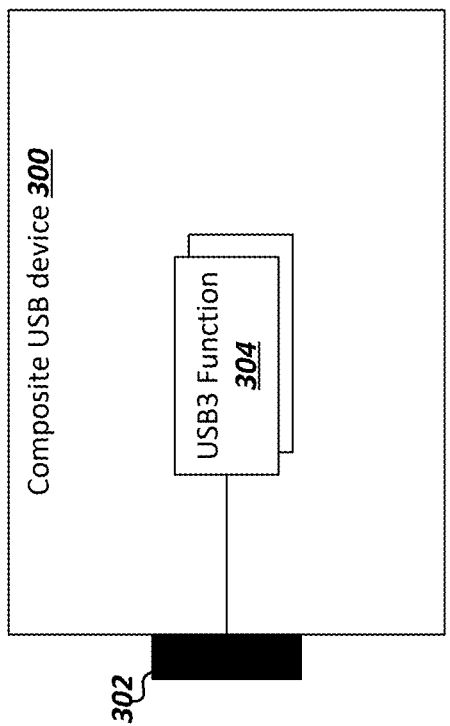

FIGS. 3A, 3B illustrate example topologies for a composite USB device 300 and a compound USB device 310, respectively. Referring to FIG. 3A, the example composite USB device 300 includes a port 302 to connect the device 300 to a host device and allows the host device to interface with one or more USB3 functions 304 of the device 300. Each of the USB3 functions 304 may perform a certain independent function and behave as if it is contained within a separate peripheral device, i.e., they may be seen as separate USB devices by the host device.

Referring to FIG. 3B, the example compound USB device 310 includes a port 312 to connect the device 310 to a host device, as with the device 300. However, the device 310 also includes an embedded USB3 hub 314 that allows the host device to interface with different embedded USB devices 316, 318 of the device 310. In the example shown, the embedded device 316 is a USB3 device while the device 318 is a USB2 device.

As used herein, a "USBX device" may refer to a device that is compatible with a USB-based protocol according to a specification of version X or X.x (e.g., version 3 or version 3.0). Thus, a USB2 device or USB2 interface may refer to a device or interface that is compatible with USB v2.x (i.e., USB v. 2.0, 2.1, etc.) protocols and/or specifications, and a USB3 device or USB3 interface may refer to a device or interface that is compatible with USB v3.x (i.e., USB v. 3.0, 3.1, etc.) protocols and/or specifications. A USB2 or High Speed (HS) interface as described herein may implement a data transfer protocol that provides a 480 Mbit/s bandwidth, while a USB3 or Super Speed (SS) interface as described herein may implement a data transfer protocol that provides a 5.0 Gbit/s bandwidth or higher (e.g., 10 Gbit/s or 20 Gbit/s).

USB specifications define different capabilities for USB2 and USB3 low power modes. For instance, USB2 allows for port-level suspend with two levels of entry/exit latency and device-level power management, while USB3 allows for multi-level link power management supporting idle, sleep, and suspend states and link-, device-, and function-level power management. Further, in USB3, there are different low power states and resuming from a suspend state is achieved through LFPS (Low Frequency Periodic Signaling) signaling at link level.

Telemetry/Debug functions can vary from accessing registers via a TAP network, debugging the OS or an application with debuggers, capturing hardware or software traces, and so on. This means that a System Under Test (SUT) shall expose multiple functions to a debug host, where each function is a separate interface. As used herein, telemetry may include debug data and/or trace data, and such terms may be used interchangeably herein.

Challenges may arise in telemetry/debug scenarios when all these telemetry/debug functions share a single peripheral device where time-critical low power debugging is not possible, as in some instances, USB IPs are part of a system-on-chip (SoC) and may accordingly be power gated when the SoC enters a low power mode. In other instances, the USB IP used for debug may be blocking the platform from entering low power states. This is invasive and may make debug over USB impracticable in certain instances. To address these limitations, newer designs have included "debug islands", which may refer to an isolated power domain for low power debugging with lower USB speed capabilities to meet system requirements.

Figure 4:
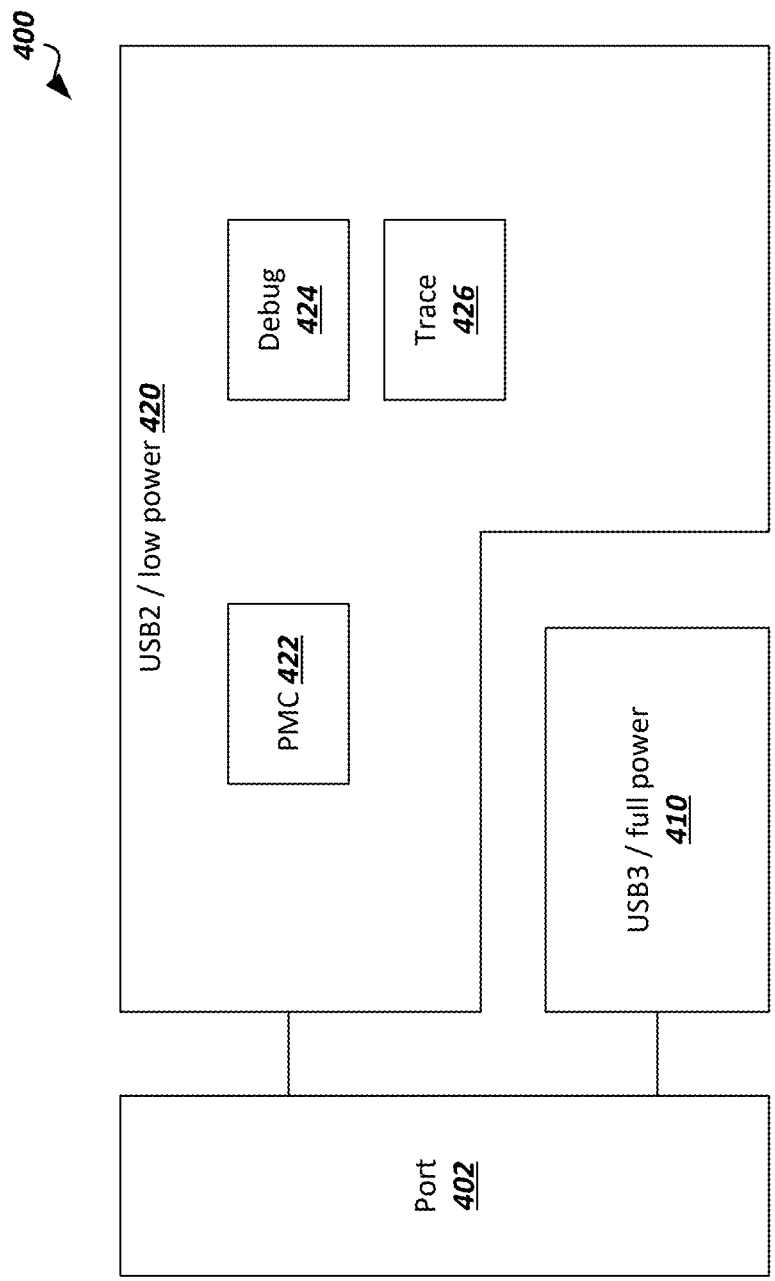
FIG. 4 illustrates an example peripheral device with a debug island.

FIG. 4 illustrates an example peripheral device 400 with a debug island. As shown, the example device 400 includes a main port 402 to connect the device 400 to a host device. The device 400 also includes USB 3.0 Super Speed interface 410 as a main debug interface, and a USB 2.0 High Speed interface 420 as a debug island interface (with power management controller (PMC) 422, debug module 424, and trace module 426), mixing two interfaces with different speeds for same function. This may introduce new challenges in the way of functional and behavioral changes in the way a SUT is able to share debug functionalities. The debug island may include other interfaces than the USB interfaces shown.

For instance, the isolated debug/telemetry functionalities as shown in FIG. 4 may introduce challenges in sharing a smooth transition between the interfaces 410, 420. Transitions between the interfaces may lead to confusion of end users, since the IO interface switching between the USB Super Speed (SS) interface 410 to the USB2 High Speed (HS) interface 420 will lead to disconnects and re-enumerations of the IO interfaces. This behavior can lead to a bad user experience (e.g., slow transitions) and loss of continuous data collection). For example, since the switching process is controlled by the debug host, it may take many 100 s of milliseconds or even seconds to switch between the interfaces 410, 420. During this time, debug may effectively not be possible, causing blind spots when going through power transitions and invasiveness due to re-enumeration (changing the run-timer behavior).

Low-power mode debug/telemetry may be quite important to bringing up a computer system faster and to reducing man hours in debugging. However, challenges can arise with debug/telemetry interfaces when a system transitions from a high-power/active mode to a low-power mode, as such devices are disconnected during such transitions, causing a bad user experience and loss of time in low power mode.

Figure 5:
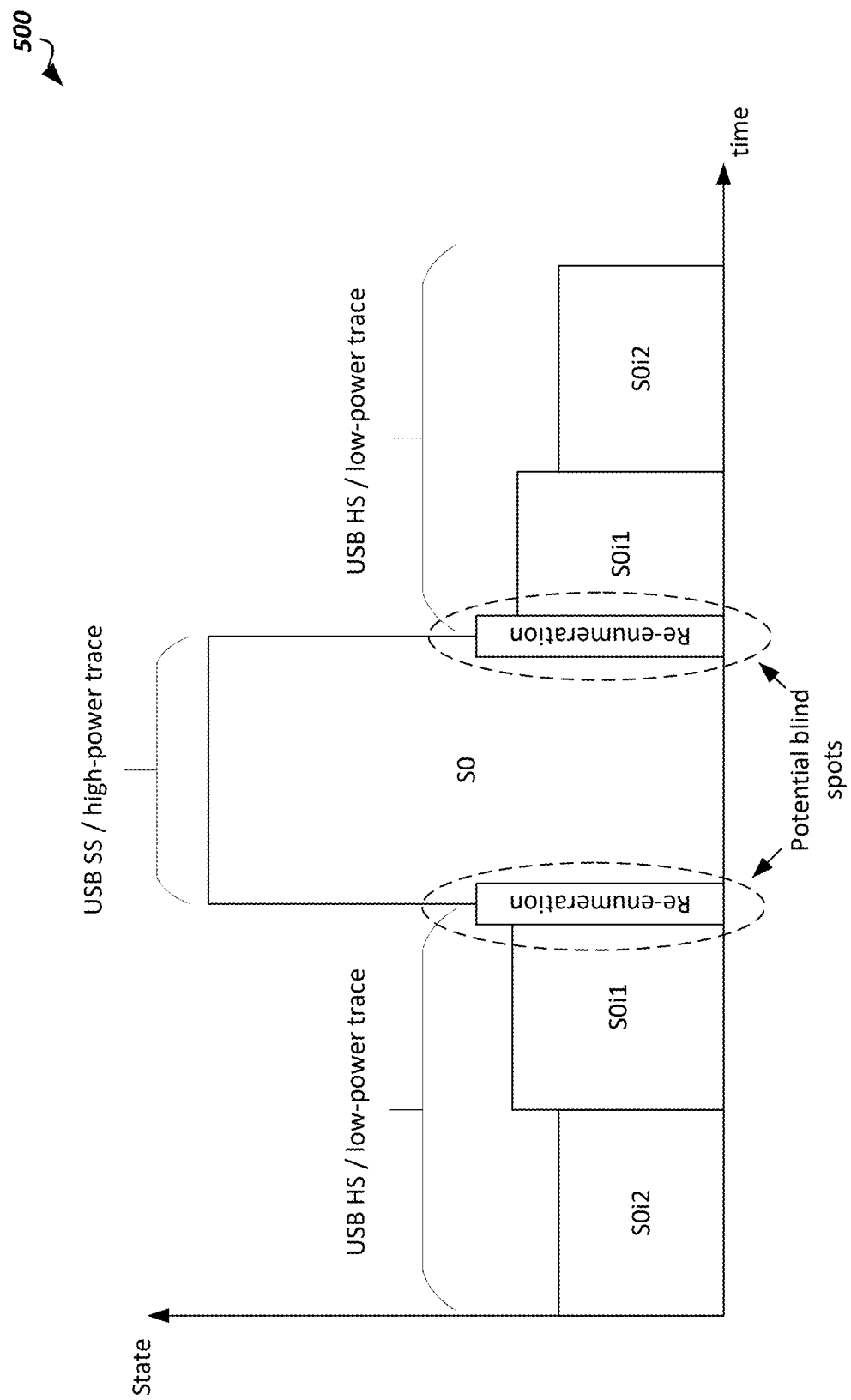
FIG. 5 illustrates example state transitions in the device of FIG. 4.

FIG. 5 illustrates example state transitions in the device 400 of FIG. 4. As shown, the device 400 may get disconnected and re-enumerated during low-power to high-power transitions (or vice versa) and lag support of seamless low power debugging, causing significant blind spots and system perturbations as a result. Thus, a user may be required to select either the HS mode and accept the limited bandwidth (e.g., USB2 debug may not provide enough bandwidth when main processor cores are running) or use the SS mode and accept that the platform remains in a high power (e.g., S0) state (since USB3 debug may block the platform from entering a low power mode since the operating system (OS) won't allow the transition due to the ongoing debug traffic.

One solution to this has been to buffer data while the platform is in the low power mode, until the high-bandwidth PHY (e.g., the USB3 interface) can be reactivated, after which the data will begin to be transmitted again. However, this can be problematic, as the platform may remain in the low-power mode for quite a long time in certain instances, leading to an almost indefinite period of buffering (which may be impossible for buffers of limited sizes).

In embodiments of the present disclosure, multiple functions may be shared from a peripheral device/system under test (SUT) as a USB device with multiple device addresses, allowing telemetry or debug in different power states. For instance, in one embodiment, a multi-address (compound) peripheral device on a single port may be used for debug, allowing seamless function selection across two USB devices through interface selection by single driver/software and two USB devices sharing same/similar functionality but for different power modes at different USB speeds. The multi-address (compound) device may thus provide access to active (e.g., S0) and low power (e.g., S0ix) debug islands, and a debug host can dynamically set the interface needed to collect the debug/telemetry data of the SUT without the need for a hub. This may allow for a power management controller (PMC) to decide which interface to use depending on the power state and/or needed bandwidth, rather than the OS (e.g., where the OS may maintain a high power state with ongoing USB3/SS debug transfers occurring).

Figure 6:
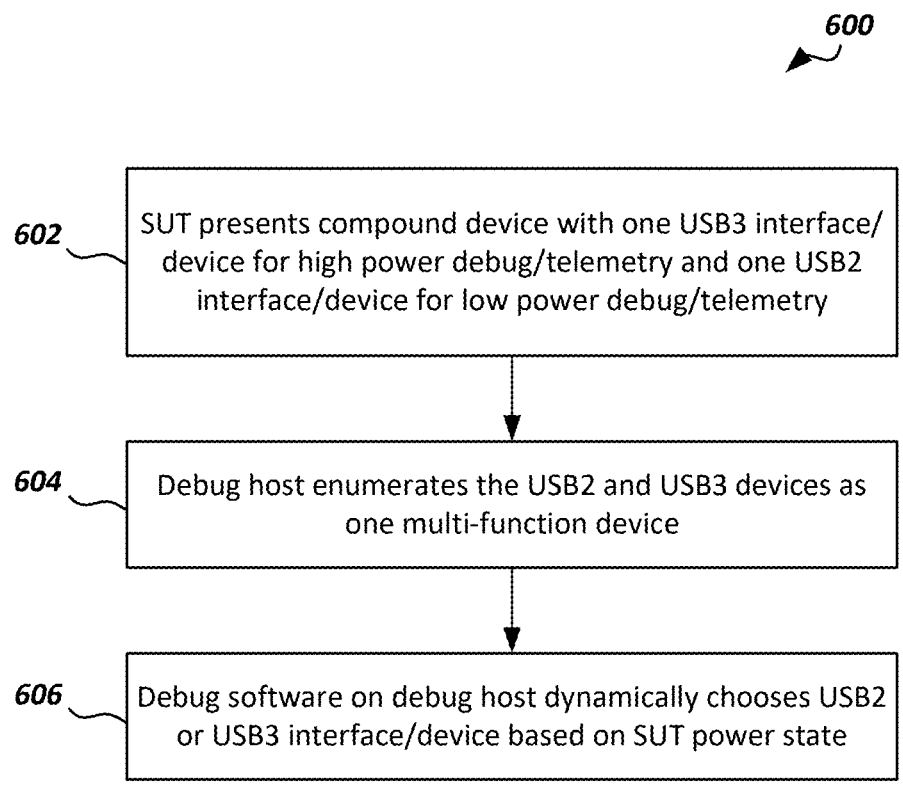
FIG. 6 illustrates a flow diagram of an example process of enumerating a system under test (SUT) in accordance with embodiments of the present disclosure.

FIG. 6 illustrates a flow diagram of an example process 600 of enumerating a system under test (SUT) in accordance with embodiments of the present disclosure. At 602, a given SUT may present a compound peripheral device with a USB3 interface/device for super speed active telemetry and a USB2 interface/device for high-speed low power mode telemetry. At 604, the debug host, its driver, and software then enumerates the USB2 and USB3 devices of the peripheral device as one multiple function device. At 606, debug software on the debug host dynamically chooses the functional device by determining the SUT's power state. For instance, the debug software may detect changes in the power state (e.g., transitions from the low power to high power state, or vice versa) and select the debug interface accordingly, e.g., as described further below. In some cases, when the interface of a particular telemetry mode is not in use, the debug software can set the alternate interface with no endpoints and the debug host can communicate only with the active data interface. In this way, the debug software can then provide a seamless debug data collection without losing data or causing interrupting re-enumerations.

Although the examples here are described with respect to telemetry/debug data collection, aspects of the present disclosure may be implemented for use in any suitable data collection/transfer between devices over a USB interface. For example, a USB host can set an interface of a connected USB device based on the power modes automatically for any type of data transfer, allowing the system to move into low power modes to conserve energy while also maintaining data transfer capabilities.

Figure 7:
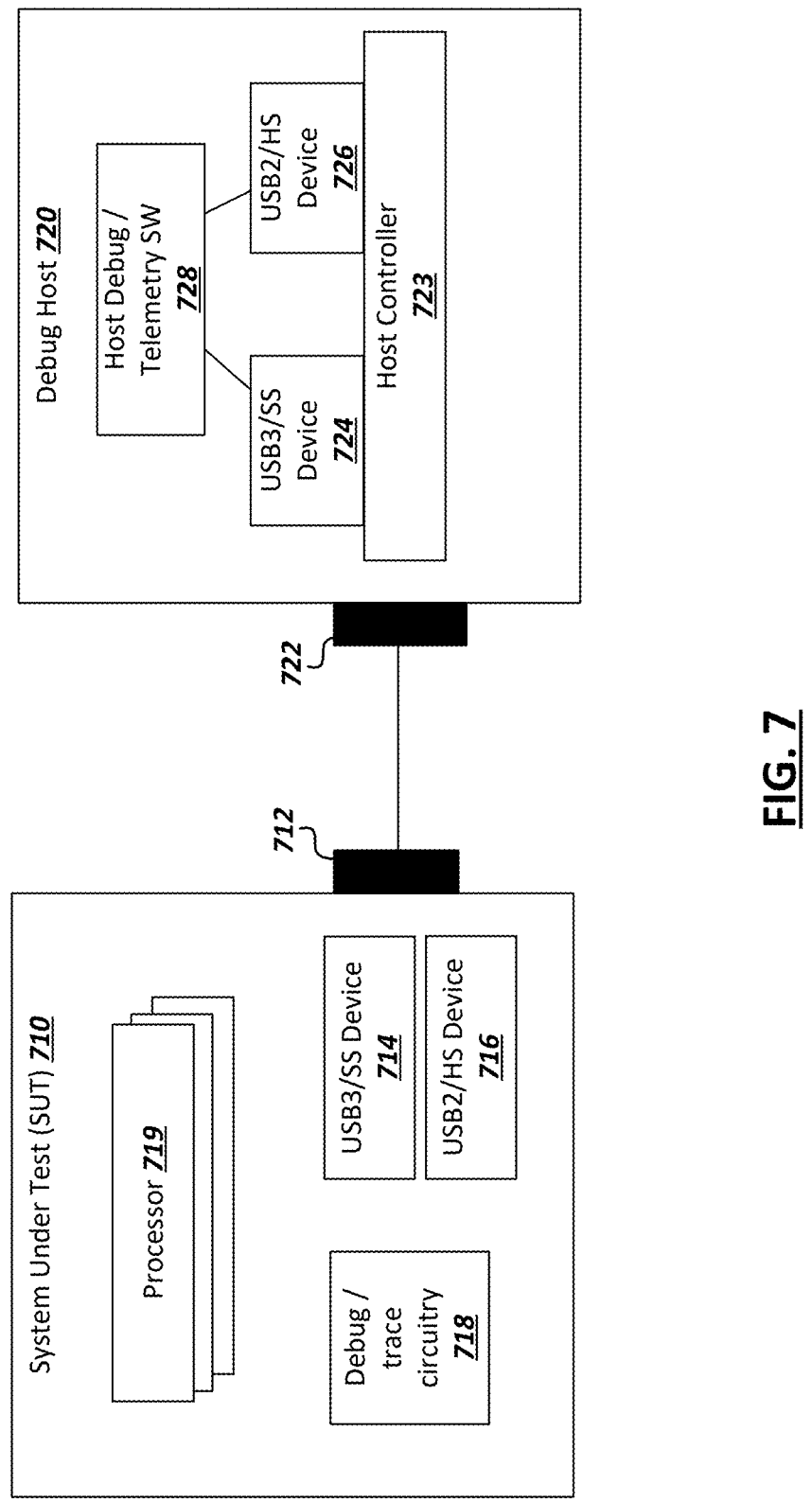
FIG. 7 illustrates an example SUT enumerated by a debug host according to the process of FIG. 6.

FIG. 7 illustrates an example SUT 710 enumerated by a debug host 720 according to the process 600 of FIG. 6. The SUT 710 includes a port 712 (e.g., a USB-compatible port) to connect the SUT 710 to the debug host 720. The SUT 710 acts as a compound device with USB3 device 714 and USB2 device 716, and includes debug/trace circuitry 718 that implements debug and/or trace operations on one or more processors 719 (e.g., CPUs, GPUs, etc.) or other types of circuitry on the SUT 710 and provide corresponding debug data to the debug host 720 through the USB2 or USB3 devices. The port 712 may be any suitable type of USB port, such as a USB type A port or USB-C port. Further, in some instances, the port 712 may be a non-USB port, such as where USB traffic is sent over non-USB ports/connectors or with blue-wiring.

The debug host 720 includes a port 722 (e.g., a USB-compatible port) to connect the debug host 720 to the SUT 710. The debug host also includes a host controller 723 to control communications over the port 722. As shown, the host controller 723 has separately enumerated each of the devices of the SUT 710 (e.g., as devices 724, 726). The debug host 720 also includes host debug/telemetry software 728 that controls the debug operations performed on the SUT 710 (e.g., through debug/trace circuitry 718) and interfaces with the enumerated devices 724, 726 corresponding to the devices 714, 716 of the SUT 710, e.g., as described further below with respect to FIG. 8. The port 722 may be any suitable type of USB port, such as a USB type A port or USB-C port. Further, in some instances, the port 722 may be a non-USB port, such as where USB traffic is sent over non-USB ports/connectors or with blue-wiring.

Figure 8:
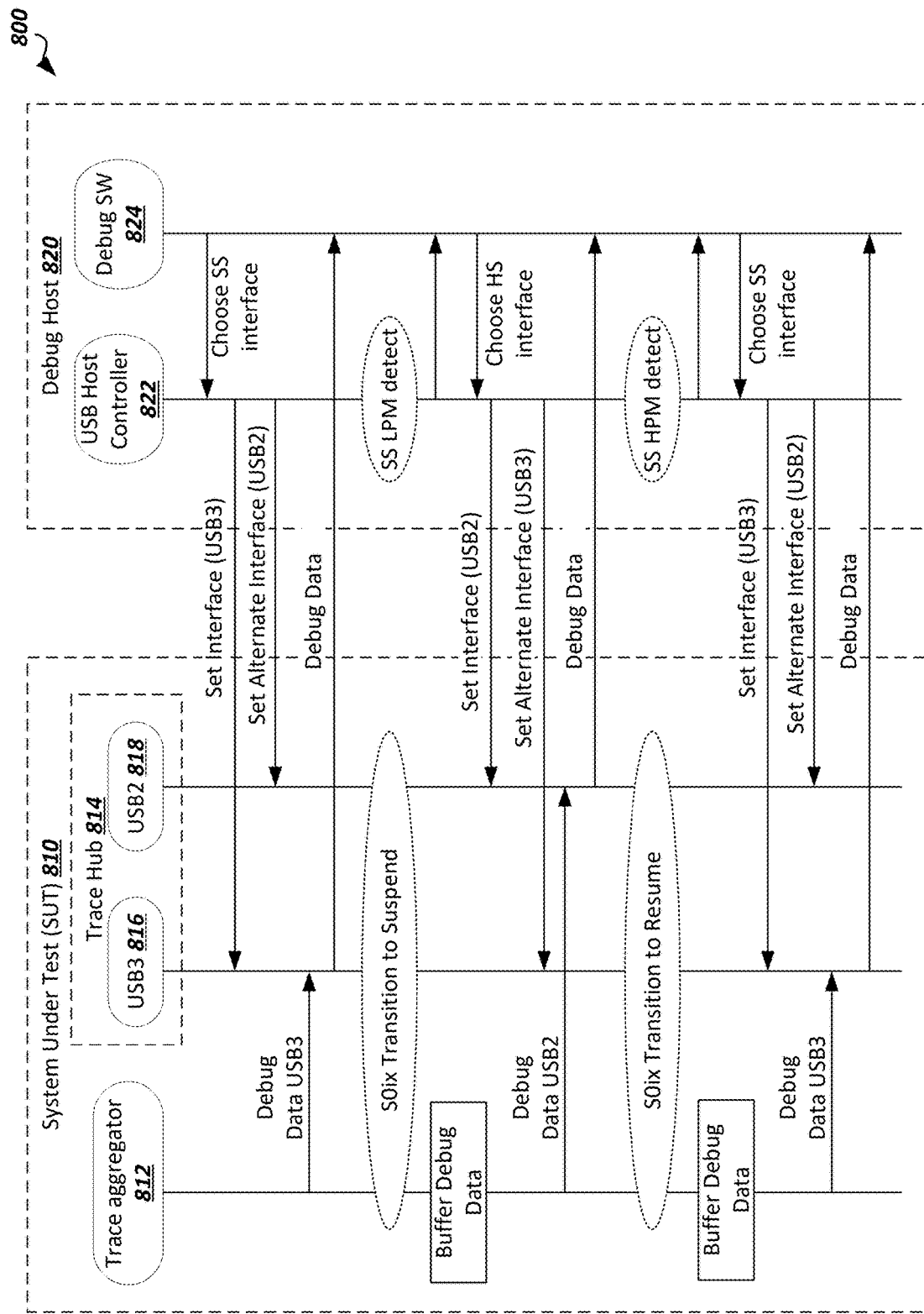
FIG. 8 illustrates an example debug data transfer sequence between a SUT and a debug host in accordance with embodiments of the present disclosure.

FIG. 8 illustrates an example debug data transfer sequence 800 between a SUT 810 and a debug host 820 in accordance with embodiments of the present disclosure. In the example shown, the SUT 810 may be implemented similar to the SUT 710 of FIG. 7 and the debug host 820 may be implemented similar to the debug host 720 of FIG. 7. The SUT 810 includes a trace aggregator 812 that produces trace data and a trace hub 814 that handles the switching between the USB3 and USB2 interfaces 816, 818 (respectively). The debug host 820 includes a USB host controller 822 and debug software 824 (e.g., similar to the debug software 728 of FIG. 7).

The example sequence 800 may occur after enumeration, e.g., according to the process 600 above. For instance, when the SUT 810 enters telemetry or debug mode, the SUT may be enabled in USB transport mode through a "DEVICE MODE CONTROL REG 0" (or equivalent) which is in the always on (AON) domain (or equivalent) to present both USB3 and USB2 devices to the debug host 820 using the USB port. The SUT 810 may then provide alternate interface options with no function (i.e., that there are no end points on the interface) to enable the host debug software to indicate the device is not in use. This may be used by host debug software to set a particular interface as "active" through "set interface" requests (e.g., via a USB Set Interface request) so that the controller in the host is not opening endpoints of unused debug devices.

As described above, the debug host 820 may enumerate both USB2 and USB3 devices of the SUT 810 first USB-based interface and a second USB-based interface, even though they are compound devices. For instances, the debug software 824 may open both devices and provide an option indicating both the USB3 and USB2 interfaces, allowing the user to choose between them.

After successful enumeration, the debug software 824 may detect the power state of the super speed (SS) and high speed (HS) interfaces of the SUT 810, and choose based on the detected power states. In some cases, the debug software 824 may default to the USB3 interface of the SUT 810 (e.g., where both interfaces are in high power (S0) modes).

For instance, in the example shown, the debug software 824 first selects the USB3/SS interface. This may be based on detecting that the SUT is in an active power state. The debug software 824 may accordingly open the USB3/SS data stream for data communication and set the USB2/HS interface to the alternate interface (e.g., via a USB Set Interface Request indicating that the interface is to be set as an alternate interface, referred to herein as a "set alternate interface" request) with non-functional/non-operational mode. In response to this, the USB host controller 822 may issue a set interface request to the USB3 interface 816 of the SUT 810 as shown. Based on this, the trace aggregator 812 may send its debug data via the USB3 interface 816 as shown.

At a later time, the SUT 810 transitions to a suspend power mode (e.g., S0ix) as shown. The USB host controller 822 detects the low power mode (LPM) transition to suspend and indicates the transition to the debug software 824. In response, the debug software 824 switches the software's data stream to the USB2/HS interface. In particular, the debug software 824 may indicate the choice of/switch to the USB2/HS interface to the USB host controller 822, which may in turn issue a set interface request to the USB2 interface 818 and a set alternate interface request to the USB3 interface 816 to put it into a non-functional/non-operational mode.

During this time, and in response to the transition to suspend mode, the SUT 810 (via the trace aggregator 812) has begun to buffer the debug data being generated. Once the set interface request is received from the USB host controller 822, the USB2 interface 818 may be set as active on the SUT 810 (e.g., by the USB circuitry thereon) and the trace aggregator 812 may then begin providing the debug data to the USB2/HS interface 818 as shown.

Then, at a later time, the SUT 810 transitions to resume an active/high power mode (e.g., S0) as shown. The USB host controller 822 detects the high power mode (HPM) transition, and indicates the transition to the debug software 824. In response, the debug software 824 switches the software's data stream to the USB3/SS interface. In particular, the debug software 824 may indicate the choice of/switch to the USB3/SS interface to the USB host controller 822, which may in turn issue a set interface request to the USB3 interface 816 and a set alternate interface request to the USB2 interface 818 to put it into a non-functional/non-operational mode.

During this time, and in response to the transition to the active mode, the SUT 810 (via the trace aggregator 812) has again begun to buffer the debug data being generated. Once the set interface request is received from the USB host controller 822, the USB3 interface 816 may be set as active the trace aggregator 812 may then begin providing the debug data to the USB3/SS interface 816 as shown.

Figure 9:
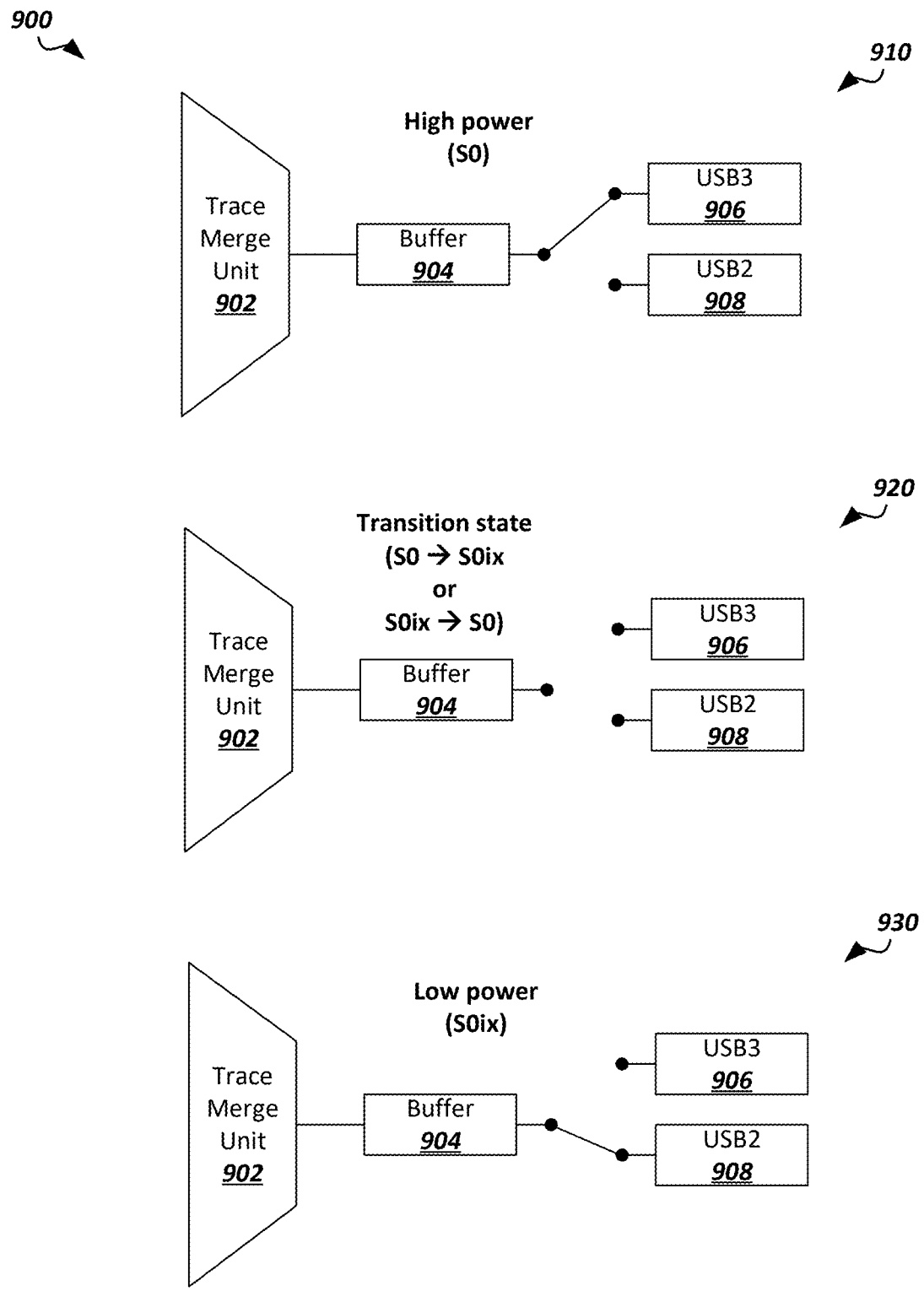
FIG. 9 illustrates an example process of buffering during power state transitions in accordance with embodiments of the present disclosure.

FIG. 9 illustrates an example process 900 of buffering during power state transitions in accordance with embodiments of the present disclosure. In the example shown, a trace merge unit 902 provides trace data to a buffer 904 before it is provided to a USB interface, i.e., one of USB3 interface 906 or USB2 interface 908. The trace merge unit 902 and/or buffer 904 may be implemented inside a trace aggregator (e.g., trace aggregator 812 of FIG. 8), or in another location of a SUT.

As shown, at 910, the SUT is in a high power/active mode (e.g., S0). Accordingly, the debug data from the trace merge unit 902 is provided to the USB3 interface 906. At 920, a power state transition is detected (e.g., from S0→S0ix or vice versa), and the debug data is not provided to either USB interface. Instead, the data is buffered in the buffer 904 until a new set interface request is issued by the host debug device. Once the set interface request is received, the buffered debug data is then provided to the USB2 interface 908 as shown at 930.

Figure 10:
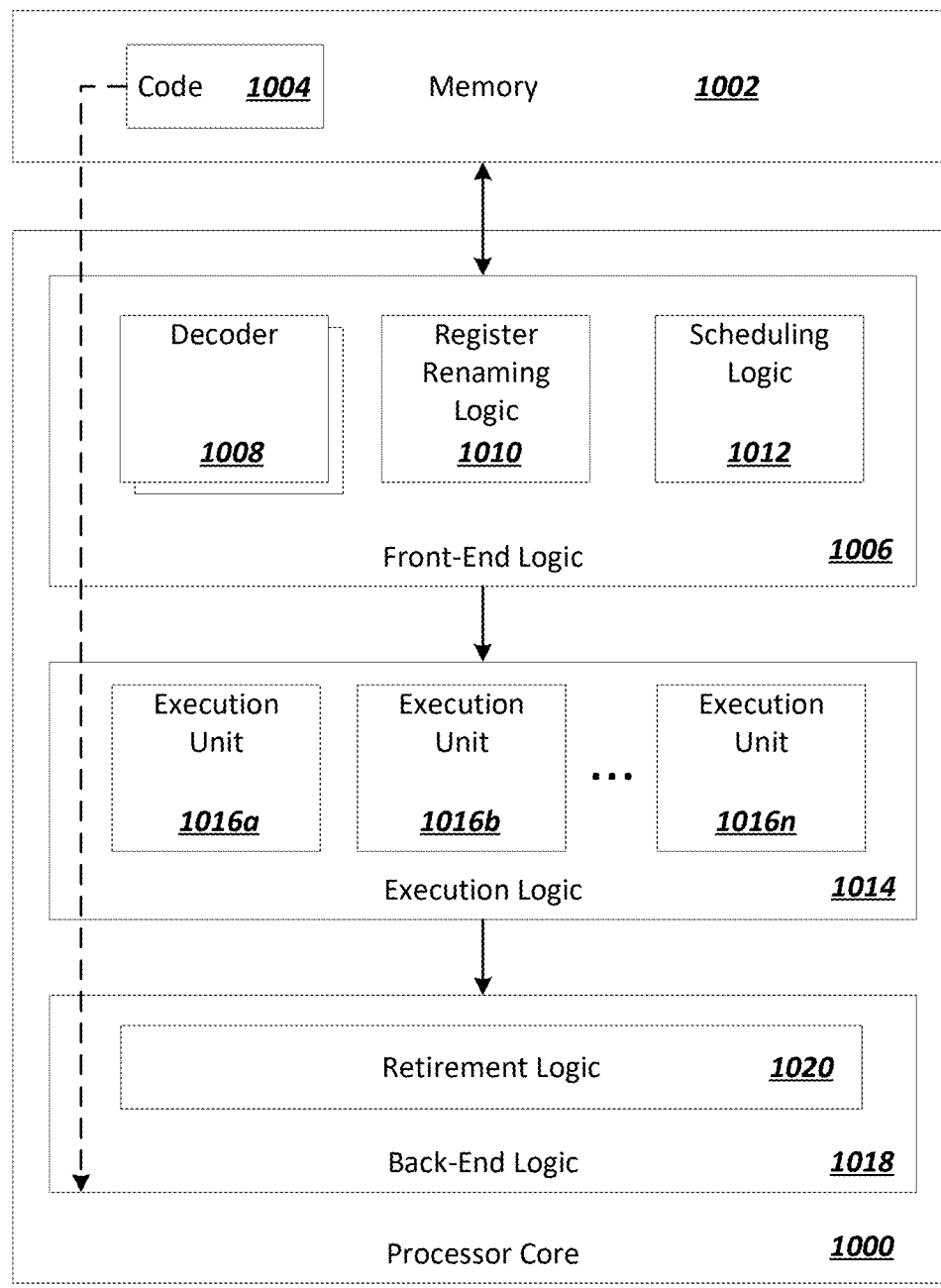
FIG. 10 is an example illustration of a processor according to an embodiment.
Figure 11:
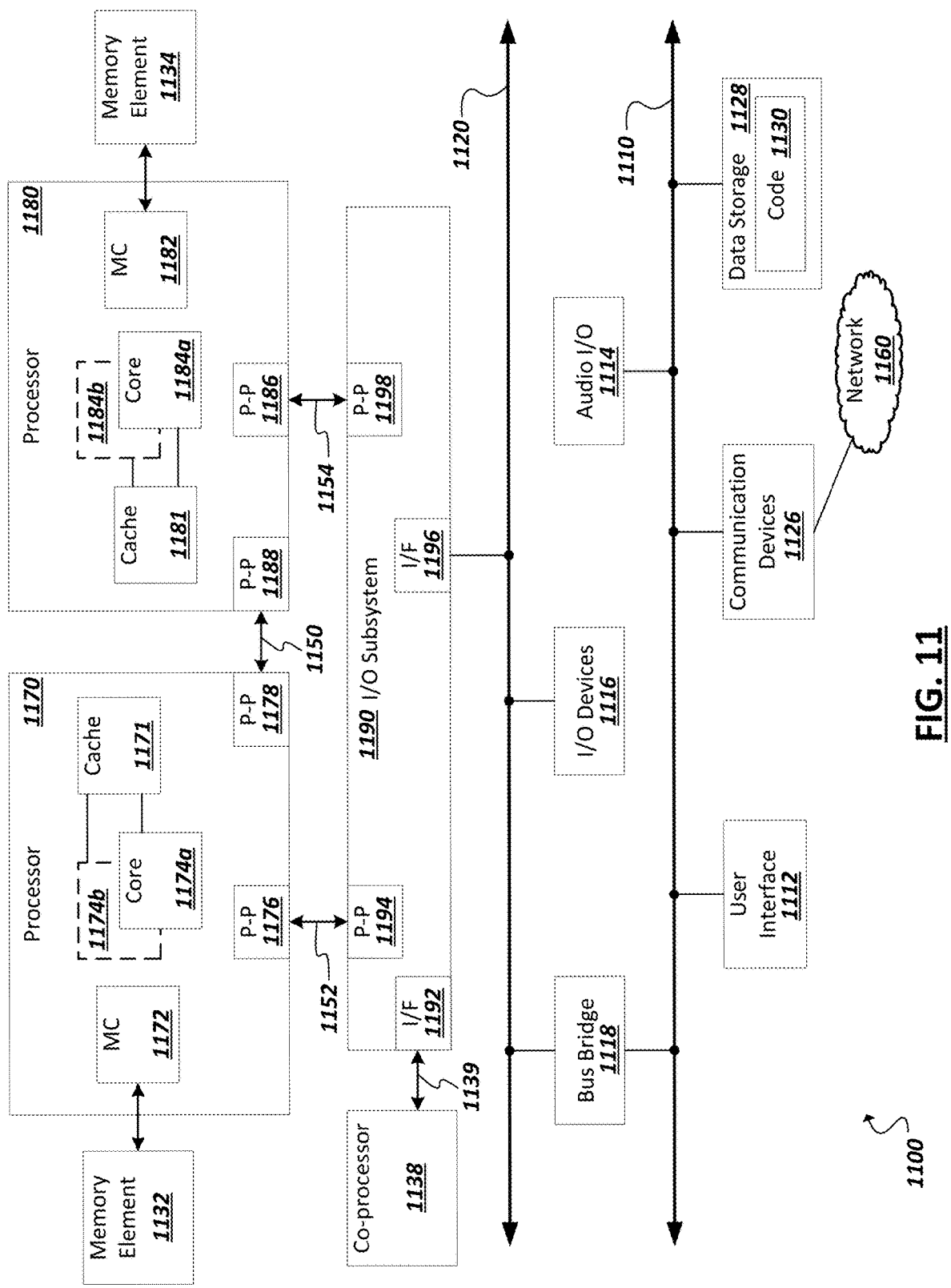
FIG. 11 illustrates a computing system that is arranged in a point-to-point (PtP) configuration according to an embodiment.

FIGS. 10-11 are block diagrams of example computer architectures that may be used in accordance with embodiments disclosed herein. Other computer architecture designs known in the art for processors and computing systems may also be used. Generally, suitable computer architectures for embodiments disclosed herein can include, but are not limited to, configurations illustrated in FIGS. 10-11.

FIG. 10 is an example illustration of a processor according to an embodiment. Processor 1000 is an example of a type of hardware device that can be used in connection with the implementations above. Processor 1000 may be any type of processor, such as a microprocessor, an embedded processor, a digital signal processor (DSP), a network processor, a multi-core processor, a single core processor, or other device to execute code. Although only one processor 1000 is illustrated in FIG. 10, a processing element may alternatively include more than one of processor 1000 illustrated in FIG. 10. Processor 1000 may be a single-threaded core or, for at least one embodiment, the processor 1000 may be multi-threaded in that it may include more than one hardware thread context (or "logical processor") per core.

FIG. 10 also illustrates a memory 1002 coupled to processor 1000 in accordance with an embodiment. Memory 1002 may be any of a wide variety of memories (including various layers of memory hierarchy) as are known or otherwise available to those of skill in the art. Such memory elements can include, but are not limited to, random access memory (RAM), read only memory (ROM), logic blocks of a field programmable gate array (FPGA), erasable programmable read only memory (EPROM), and electrically erasable programmable ROM (EEPROM).

Processor 1000 can execute any type of instructions associated with algorithms, processes, or operations detailed herein. Generally, processor 1000 can transform an element or an article (e.g., data) from one state or thing to another state or thing.

Code 1004, which may be one or more instructions to be executed by processor 1000, may be stored in memory 1002, or may be stored in software, hardware, firmware, or any suitable combination thereof, or in any other internal or external component, device, element, or object where appropriate and based on particular needs. In one example, processor 1000 can follow a program sequence of instructions indicated by code 1004. Each instruction enters a front-end logic 1006 and is processed by one or more decoders 1008. The decoder may generate, as its output, a micro operation such as a fixed width micro operation in a predefined format, or may generate other instructions, microinstructions, or control signals that reflect the original code instruction. Front-end logic 1006 also includes register renaming logic 1010 and scheduling logic 1012, which generally allocate resources and queue the operation corresponding to the instruction for execution.

Processor 1000 can also include execution logic 1014 having a set of execution units 1016a, 1016b, 1016n, etc. Some embodiments may include a number of execution units dedicated to specific functions or sets of functions. Other embodiments may include only one execution unit or one execution unit that can perform a particular function. Execution logic 1014 performs the operations specified by code instructions.

After completion of execution of the operations specified by the code instructions, back-end logic 1018 can retire the instructions of code 1004. In one embodiment, processor 1000 allows out of order execution but requires in order retirement of instructions. Retirement logic 1020 may take a variety of known forms (e.g., re-order buffers or the like). In this manner, processor 1000 is transformed during execution of code 1004, at least in terms of the output generated by the decoder, hardware registers and tables utilized by register renaming logic 1010, and any registers (not shown) modified by execution logic 1014.

Although not shown in FIG. 10, a processing element may include other elements on a chip with processor 1000. For example, a processing element may include memory control logic along with processor 1000. The processing element may include I/O control logic and/or may include I/O control logic integrated with memory control logic. The processing element may also include one or more caches. In some embodiments, non-volatile memory (such as flash memory or fuses) may also be included on the chip with processor 1000.

FIG. 11 illustrates a computing system 1100 that is arranged in a point-to-point (PtP) configuration according to an embodiment. In particular, FIG. 11 shows a system where processors, memory, and input/output devices are interconnected by a number of point-to-point interfaces. Generally, one or more of the computing systems described herein may be configured in the same or similar manner as computing system 1100.

Processor 1170 includes cores 1174a, 1174b and a cache 1171. Processor 1180 similarly includes cores 1184a, 1184b and a cache 1181. Processors 1170 and 1180 may also each include integrated memory controller logic (MC) 1172 and 1182 to communicate with memory elements 1132 and 1134. In alternative embodiments, memory controller logic 1172 and 1182 may be discrete logic separate from processors 1170 and 1180. Memory elements 1132 and/or 1134 may store various data to be used by processors 1170 and 1180 in achieving operations and functionality outlined herein.

Processors 1170 and 1180 may be any type of processor, such as those discussed in connection with other figures. Processors 1170 and 1180 may exchange data via a point-to-point (PtP) interface 1150 using point-to-point interface circuits 1178 and 1188, respectively. Processors 1170 and 1180 may each exchange data with a chipset 1190 via individual point-to-point interfaces 1152 and 1154 using point-to-point interface circuits 1176, 1186, 1194, and 1198. Chipset 1190 may also exchange data with a co-processor 1138, such as a high-performance graphics circuit, machine learning accelerator, or other co-processor 1138, via an interface 1139, using PtP interface circuit 1192. In alternative embodiments, any or all of the PtP links illustrated in FIG. 11 could be implemented as a multi-drop bus rather than a PtP link.

Chipset 1190 may be in communication with a bus 1120 via an interface circuit 1196. Bus 1120 may have one or more devices that communicate over it, such as a bus bridge 1118 and I/O devices 1116. Via a bus 1110, bus bridge 1118 may be in communication with other devices such as a user interface 1112 (such as a keyboard, mouse, touchscreen, or other input devices), communication devices 1126 (such as modems, network interface devices, or other types of communication devices that may communicate through a computer network 1160), audio I/O devices 1114, and/or a data storage device 1128. Data storage device 1128 may store code 1130, which may be executed by processors 1170 and/or 1180. In alternative embodiments, any portions of the bus architectures could be implemented with one or more PtP links.

The computer system depicted in FIG. 11 is a schematic illustration of an embodiment of a computing system that may be utilized to implement various embodiments discussed herein. It will be appreciated that various components of the system depicted in FIG. 11 may be combined in a system-on-a-chip (SoC) architecture or in any other suitable configuration capable of achieving the functionality and features of examples and implementations provided herein.

While some of the systems and solutions described and illustrated herein have been described as containing or being associated with a plurality of elements, not all elements explicitly illustrated or described may be utilized in each alternative implementation of the present disclosure. Additionally, one or more of the elements described herein may be located external to a system, while in other instances, certain elements may be included within or as a portion of one or more of the other described elements, as well as other elements not described in the illustrated implementation. Further, certain elements may be combined with other components, as well as used for alternative or additional purposes in addition to those purposes described herein.

Further, it should be appreciated that the examples presented above are non-limiting examples provided merely for purposes of illustrating certain principles and features and not necessarily limiting or constraining the potential embodiments of the concepts described herein. For instance, a variety of different embodiments can be realized utilizing various combinations of the features and components described herein, including combinations realized through the various implementations of components described herein. Other implementations, features, and details should be appreciated from the contents of this Specification.

Although this disclosure has been described in terms of certain implementations and generally associated methods, alterations and permutations of these implementations and methods will be apparent to those skilled in the art. For example, the actions described herein can be performed in a different order than as described and still achieve the desirable results. As one example, the processes depicted in the accompanying figures do not necessarily require the particular order shown, or sequential order, to achieve the desired results. In certain implementations, multitasking and parallel processing may be advantageous. Additionally, other user interface layouts and functionality can be supported. Other variations are within the scope of the following claims.

In general, one aspect of the subject matter described in this specification can be embodied in methods and executed instructions that include or cause the actions of identifying a sample that includes software code, generating a control flow graph for each of a plurality of functions included in the sample, and identifying, in each of the functions, features corresponding to instances of a set of control flow fragment types. The identified features can be used to generate a feature set for the sample from the identified features These and other embodiments can each optionally include one or more of the following features. The features identified for each of the functions can be combined to generate a consolidated string for the sample and the feature set can be generated from the consolidated string. A string can be generated for each of the functions, each string describing the respective features identified for the function. Combining the features can include identifying a call in a particular one of the plurality of functions to another one of the plurality of functions and replacing a portion of the string of the particular function referencing the other function with contents of the string of the other function. Identifying the features can include abstracting each of the strings of the functions such that only features of the set of control flow fragment types are described in the strings. The set of control flow fragment types can include memory accesses by the function and function calls by the function. Identifying the features can include identifying instances of memory accesses by each of the functions and identifying instances of function calls by each of the functions. The feature set can identify each of the features identified for each of the functions. The feature set can be an n-graph.

Further, these and other embodiments can each optionally include one or more of the following features. The feature set can be provided for use in classifying the sample. For instance, classifying the sample can include clustering the sample with other samples based on corresponding features of the samples. Classifying the sample can further include determining a set of features relevant to a cluster of samples. Classifying the sample can also include determining whether to classify the sample as malware and/or determining whether the sample is likely one of one or more families of malware. Identifying the features can include abstracting each of the control flow graphs such that only features of the set of control flow fragment types are described in the control flow graphs. A plurality of samples can be received, including the sample. In some cases, the plurality of samples can be received from a plurality of sources. The feature set can identify a subset of features identified in the control flow graphs of the functions of the sample. The subset of features can correspond to memory accesses and function calls in the sample code.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

The following examples pertain to embodiments in accordance with this Specification. It will be understood that certain examples may be combined with certain other examples, in certain embodiments.

Example 1 includes an apparatus comprising: interconnect circuitry to implement one or more layers of a Universal Serial Bus (USB)-based protocol, wherein the interconnect circuitry comprises: circuitry to implement a first USB-based interface; circuitry to implement a second USB-based interface; and telemetry circuitry to: generate telemetry data; cause the telemetry data to be transmitted via the first USB-based interface; detect a power state transition in the apparatus; cause the telemetry data to be buffered based on detecting the power state transition; and cause the buffered telemetry data to be transmitted via the second USB-interface based on a set interface request indicating the second USB-interface; and a port to transmit the telemetry data over a USB-based link.

Example 2 includes the subject matter of Example 1, wherein the interconnect circuitry is to: receive the set interface request; and set the second USB-based interface in an active mode based on the set interface request.

Example 3 includes the subject matter of Example 1 or 2, wherein the interconnect circuitry is further to: receive a set alternate interface request indicating the first USB-based interface; and set the first USB-based interface in a non-functional mode based on a set alternate interface request.

Example 4 includes the subject matter of any one of Examples 1-3, wherein the first USB-based interface is to implement a USB3 protocol and the second USB-based interface is to implement a USB2 protocol.

Example 5 includes the subject matter of any one of Examples 1-4, wherein the telemetry circuitry comprises a buffer to hold the buffered telemetry data.

Example 6 includes the subject matter of any one of Examples 1-5, wherein the interconnect circuitry is to implement the first and second USB-based interfaces in a compound mode.

Example 7 includes the subject matter of any one of Examples 1-5, wherein the interconnect circuitry is to implement the first and second USB-based interfaces in a composite mode.

Example 8 includes a method comprising: generating telemetry data at a peripheral device; transmitting the telemetry data to a debug host device over a first interface implementing a Universal Serial Bus (USB)-based protocol; detecting a power state transition in the peripheral device; buffering the telemetry data based on detecting the power state transition; receiving a request from the debug host device to switch data transmission to a second interface implementing a Universal Serial Bus (USB)-based protocol; and transmitting the telemetry data to a debug host device over the second interface based on the request.

Example 9 includes the subject matter of Example 0, wherein the request is formatted as a USB Set Interface request.

Example 10 includes the subject matter of Example 9, further comprising: receiving a set alternate interface request from the debug host device to set the first interface in a non-functional mode; and setting the first interface into the non-functional mode based on the set alternate interface request.

Example 11 includes the subject matter of Example 10, wherein the set alternate interface request is formatted as a USB Set Interface request.

Example 12 includes the subject matter of any one of Examples 0-11, wherein the first interface implements a USB3 protocol and the second interface implements a USB2 protocol.

Example 13 includes one or more computer-readable media comprising instructions that, when executed by a machine, cause the machine to perform the method of any one of Examples 0-12.

Example 14 includes a system comprising: a debug host comprising: a host controller to implement one or more layers of a Universal Serial Bus (USB)-based protocol; and a peripheral device connected to the debug host over a USB-based link, the peripheral device comprising: a buffer; and interconnect circuitry to implement one or more layers of the USB-based protocol, wherein the interconnect circuitry comprises: circuitry to implement a first USB-based interface; circuitry to implement a second USB-based interface; and telemetry circuitry to: generate telemetry data; cause the telemetry data to be transmitted via the first USB-based interface; detect a power state transition in the peripheral device; cause the telemetry data to be stored in the buffer based on detecting the power state transition; receive a set interface request from the debug host indicating the second USB-based interface; and cause the buffered telemetry data to be transmitted via the second USB-interface based on a set interface request received from the debug host indicating the second USB-interface.

Example 15 includes the subject matter of Example 13, wherein the first USB-based interface is to implement a USB3 protocol and the second USB-based interface is to implement a USB2 protocol.

Example 16 includes the subject matter of any one of Examples 13-15, wherein the buffer is in the telemetry circuitry.

Example 17 includes the subject matter of any one of Examples 13-16, wherein the host controller of the debug host is further to: receive an indication from the peripheral device that the peripheral device is capable of implementing the first USB-based interface and the second USB-based interface; enumerate the first USB-based interface and the second USB-based interface as a single functional entity; detect a power state of the peripheral device; select one of the first USB-based interface and the second USB-based interface based on the detected power state of the peripheral device; and transmit a set interface request to the peripheral device indicating the selected USB-based interface.

Example 18 includes the subject matter of any one of Examples 13-17, wherein: the host controller of the debug host is further to: detect the power state transition in the peripheral device; transmit the set interface request to the peripheral device indicating the second USB-based interface based on detection of the power state transition; and the interconnect circuitry is to set the second USB-based interface in an active mode based on the set interface request.

Example 19 includes the subject matter of Example 17, wherein: the host controller of the debug host is further to transmit a set alternate interface request to the peripheral device based on detection of the power state transition; and the interconnect circuitry is to set the first USB-based interface in non-functional mode based on the set interface request.

Example 20 includes the subject matter of Example 19, wherein the set interface request and set alternate interface request are formatted as USB Set Interface requests.

Example 21 includes an apparatus comprising: a host controller to implement one or more layers of a Universal Serial Bus (USB)-based protocol, the host controller comprising circuitry to: receive an indication from a peripheral device that the peripheral device is capable of implementing a first USB-based interface and a second USB-based interface; enumerate the first USB-based interface and the second USB-based interface as a single functional entity; detect a power state of the peripheral device; select one of the first USB-based interface and the second USB-based interface based on the detected power state of the peripheral device; and transmit a set interface request to the peripheral device indicating the selected USB-based interface.

Example 22 includes the subject matter of Example [0130], wherein the selected USB-based interface is the first USB-based interface, and the host controller circuitry is further to: detect a power state transition in the peripheral device; and transmit a set interface request to the peripheral device indicating the second USB-based interface.

Example 23 includes the subject matter of Example [0131], wherein the host controller circuitry is further to transmit a set alternate interface request to the peripheral device indicating the first USB-based interface.

Example 24 includes a method comprising: receiving an indication from a peripheral device that the peripheral device is capable of implementing the first USB-based interface and the second USB-based interface; enumerating the first USB-based interface and the second USB-based interface as a single functional entity; detecting a power state of the peripheral device; selecting one of the first USB-based interface and the second USB-based interface based on the detected power state of the peripheral device; and transmitting a set interface request to the peripheral device indicating the selected USB-based interface.

Example 25 includes the subject matter of Example 13, further comprising: detecting a power state transition in the peripheral device; transmitting a set interface request to the peripheral device indicating the second USB-based interface.

Example 26 includes the subject matter of Example 21, further comprising transmitting a set alternate interface request to the peripheral device indicating the first USB-based interface.

Example 27 includes the subject matter of Example 22, wherein the set interface request and set alternate interface request are formatted as USB Set Interface requests.

Example 28 includes one or more computer-readable media comprising instructions that, when executed by a machine, cause the machine to perform the method of any one of Examples 13-27.

Example 29 includes an apparatus comprising means to perform a method as in any preceding Example.

Example 30 includes machine-readable storage including machine-readable instructions, when executed, to implement a method as in any preceding Example or realize an apparatus as in any preceding Example.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results.

What is claimed is:

1. An apparatus comprising:
   interconnect circuitry to implement one or more layers of a Universal Serial Bus (USB)-based protocol, wherein the interconnect circuitry comprises:
   circuitry to implement a first USB-based interface;
   circuitry to implement a second USB-based interface; and
   telemetry circuitry to:
   generate telemetry data;
   cause the telemetry data to be transmitted via the first USB-based interface;
   detect a power state transition in the apparatus;
   cause the telemetry data to be buffered based on detecting the power state transition; and
   cause the buffered telemetry data to be transmitted via the second USB-based interface based on a set interface request indicating the second USB-based interface; and a port to transmit the telemetry data over a USB-based link.

2. The apparatus of claim 1, wherein the interconnect circuitry is to:
receive the set interface request; and
set the second USB-based interface in an active mode based on the set interface request.

3. The apparatus of claim 1, wherein the interconnect circuitry is further to:
receive a set alternate interface request indicating the first USB-based interface; and
set the first USB-based interface in a non-functional mode based on a set alternate interface request.

4. The apparatus of claim 1, wherein the first USB-based interface is to implement a USB3 protocol and the second USB-based interface is to implement a USB2 protocol.

5. The apparatus of claim 1, wherein the telemetry circuitry comprises a buffer to hold the buffered telemetry data.

6. The apparatus of claim 1, wherein the interconnect circuitry is to implement the first and second USB-based interfaces in a compound mode.

7. The apparatus of claim 1, wherein the interconnect circuitry is to implement the first and second USB-based interfaces in a composite mode.

8. A method comprising:
generating telemetry data at a peripheral device;
transmitting the telemetry data to a debug host device over a first interface implementing a Universal Serial Bus (USB)-based protocol;
detecting a power state transition in the peripheral device;
buffering the telemetry data based on detecting the power state transition;
receiving a request from the debug host device to switch data transmission to a second interface implementing a Universal Serial Bus (USB)-based protocol; and
transmitting the telemetry data to a debug host device over the second interface based on the request.

9. The method of claim 8, wherein the request is formatted as a USB Set Interface request.

10. The method of claim 9, further comprising:
receiving a set alternate interface request from the debug host device to set the first interface in a non-functional mode; and
setting the first interface into the non-functional mode based on the set alternate interface request.

11. The method of claim 10, wherein the set alternate interface request is formatted as a USB Set Interface request.

12. The method of claim 8, wherein the first interface implements a USB3 protocol and the second interface implements a USB2 protocol.

13. A system comprising:
a debug host comprising a host controller to implement one or more layers of a Universal Serial Bus (USB)-based protocol; and
a peripheral device connected to the debug host over a USB-based link, the peripheral device comprising:
a buffer; and
interconnect circuitry to implement one or more layers of the USB-based protocol, wherein the interconnect circuitry comprises:
circuitry to implement a first USB-based interface;
circuitry to implement a second USB-based interface; and
telemetry circuitry to:
generate telemetry data;
cause the telemetry data to be transmitted via the first USB-based interface;
detect a power state transition in the peripheral device;
cause the telemetry data to be stored in the buffer based on detecting the power state transition;
receive a set interface request from the debug host indicating the second USB-based interface; and
cause the buffered telemetry data to be transmitted via the second USB-based interface based on a set interface request received from the debug host indicating the second USB-based interface.

14. The system of claim 13, wherein the first USB-based interface is to implement a USB3 protocol and the second USB-based interface is to implement a USB2 protocol.

15. The system of claim 13, wherein the buffer is in the telemetry circuitry.

16. The system of claim 13, wherein the host controller of the debug host is further to:
receive an indication from the peripheral device that the peripheral device is capable of implementing the first USB-based interface and the second USB-based interface;
enumerate the first USB-based interface and the second USB-based interface as a single functional entity;
detect a power state of the peripheral device;
select one of the first USB-based interface and the second USB-based interface based on the detected power state of the peripheral device; and
transmit a set interface request to the peripheral device indicating the selected USB-based interface.

17. The system of claim 13, wherein:
the host controller of the debug host is further to:
detect the power state transition in the peripheral device; and
transmit the set interface request to the peripheral device indicating the second USB-based interface based on detection of the power state transition; and
the interconnect circuitry is to set the second USB-based interface in an active mode based on the set interface request.

18. The system of claim 17, wherein:
the host controller of the debug host is further to transmit a set alternate interface request to the peripheral device based on detection of the power state transition; and
the interconnect circuitry is to set the first USB-based interface in non-functional mode based on the set interface request.

19. The system of claim 18, wherein the set interface request and set alternate interface request are formatted as USB Set Interface requests.

20. One or more non-transitory computer-readable media comprising instructions that, when executed by a machine, cause the machine to:
receive an indication that a peripheral device is capable of implementing a first USB-based interface and a second USB-based interface;
enumerate the first USB-based interface and the second USB-based interface as a single functional entity;
detect a power state of the peripheral device;
select one of the first USB-based interface and the second USB-based interface based on the detected power state of the peripheral device; and
transmit a set interface request to the peripheral device indicating the selected USB-based interface.

21. The non-transitory computer-readable media of claim 20, wherein the instructions are further to cause the machine to:

detect a power state transition in the peripheral device; and transmit a set interface request to the peripheral device indicating the second USB-based interface.

22. The non-transitory computer-readable media of claim 21, wherein the instructions are further to cause the machine to transmit a set alternate interface request to the peripheral device indicating the first USB-based interface.

23. The non-transitory computer-readable media of claim 22, wherein the set interface request and set alternate interface request are formatted as USB Set Interface requests.

* * * * *